United States Patent [19]

Seats

[11] Patent Number: 4,900,991
[45] Date of Patent: Feb. 13, 1990

[54] MONOTUBE CRT

[75] Inventor: Peter Seats, Boonton, N.J.

[73] Assignee: Thomson Electron Tubes and Devices Corporation, Totowa, N.J.

[21] Appl. No.: 291,607

[22] Filed: Dec. 29, 1988

Related U.S. Application Data

[63] Continuation-in-part of Ser. No. 151,437, Feb. 2, 1988, Pat. No. 4,827,182, and a continuation-in-part of Ser. No. 151,438, Feb. 2, 1988, abandoned, and a continuation-in-part of Ser. No. 151,439, Feb. 2, 1988, Pat. No. 4,827,183.

[51] Int. Cl.$^4$ .................. H01J 29/70; H01J 31/00; H01H 1/00; H01P 7/00
[52] U.S. Cl. .................... 315/366; 335/213; 335/210; 313/431
[58] Field of Search ............... 315/366; 313/422, 431; 335/213, 210

[56] References Cited

U.S. PATENT DOCUMENTS 3,118,084  1/1964  Havn et al. .................. 315/366

Primary Examiner—Thomas H. Tarcza
Assistant Examiner—Gregory C. Issing
Attorney, Agent, or Firm—Roland Plottel

[57] ABSTRACT

A monotube CRT includes an envelope which comprises a first section that houses the electron gun and a second section that houses a fiber optics faceplate along a sidewall. An array of electromagnets is disposed along the second section for deflecting the electron beam from its longitudinal path through the envelope transversely to trace a linear scan on the faceplate. The first section of the envelope is a circular cylinder whose axis is coaxial with the longitudinal path of the electron flow. The second section of the envelope is essentially rectangular or elliptical in cross section and the undeflected beam flows adjacent one narrow sidewall opposite the sidewall housing the faceplate. Each electromagnet of the array includes a core portion adjacent said one narrow sidewall and pole pieces that flank the wide sidewalls of the section.

4 Claims, 3 Drawing Sheets

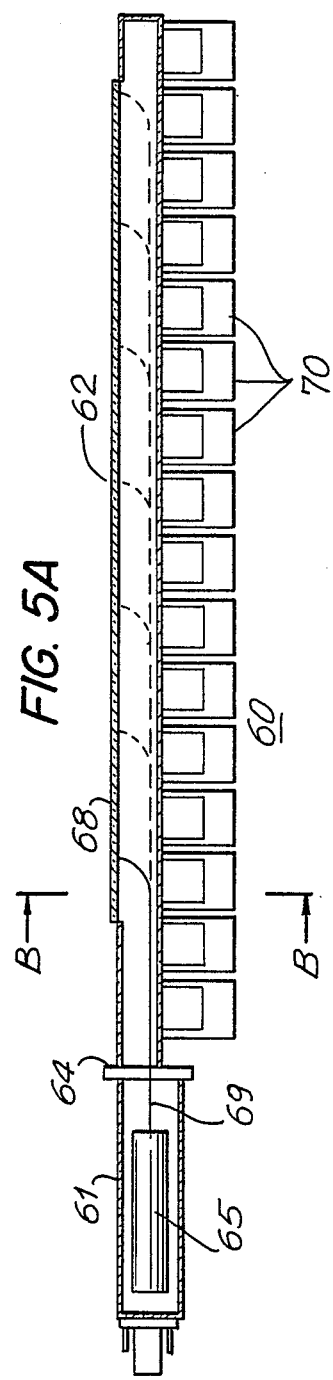
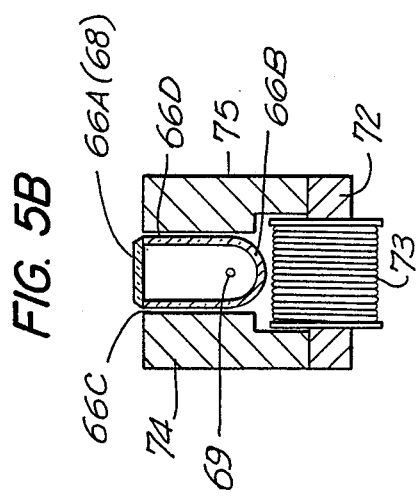
FIG. 5A
FIG. 5B

MONOTUBE CRT

RELATED APPLICATIONS

This application is a continuation-in-part of my applications Ser. No. 151,437, now U.S. Pat. No. 4,827,182, 151,438 now abandoned and 151,439, now U.S. Pat. No. 4,827,183 each filed on February 2, 1988, which are incorporated herein by reference.

This invention relates to a cathode ray tube (CRT) and more particularly to a CRT designed to provide repetitive linear scans of an elongated target positioned along a sidewall of the CRT envelope.

BACKGROUND OF THE INVENTION

In the above identified applications there are described CRT's of the kind to be termed monotubes, in which an electron beam is deflected transversely at different points along a longitudinal path of flow through the envelope of the CRT to trace a linear scan on an elongated target in a sidewall of the envelope of the CRT. Typically the target is a fiber optics faceplate used to record a visual pattern on a suitable recording medium that is moved appropriately past the faceplate.

To provide the transverse deflection desired, an array of electromagnets is positioned along the path of flow opposite the target and these are appropriately excited in turn.

To improve the efficiency of the deflection system; various structures are proposed for the CRT envelope.

In particularly, it is proposed that the tube envelope comprise two separate sections whose longitudinal axes are offset. A first circularly cylindrical section which houses the electron gun that serves as the source of the electron beam is disposed so that its longitudinal axis corresponds to the longitudinal path of the electron beam in this section. A second circularly cylindrical section, a sidewall of which houses the elongated target, is disposed so that the longitudinal path of the electron beam in this section is close to the sidewall portion of the envelope diametrically opposite the target rather than along its longitudinal axis. This is achieved preferably by assembling the two sections so that their longitudinal axes are offset rather than aligned. The array of electromagnets is positioned along the second section opposite the target.

This arrangement of the two sections is designed to improve the efficiency of the magnetic deflection by increasing the length of the path of the electron beam exposed to the deflecting magnetic field before the beam is incident on the target. This makes possible achieving a desired degree of deflection with a smaller magnetic field and so a desirably smaller and more compact electromagnetic structure.

However, this structure is still relatively inefficient in its use of the array of electromagnets for deflection.

An object of the present invention is a envelope design which improves the efficiency of the magnetic deflection system.

SUMMARY OF THE INVENTION

To this end, a CRT in accordance with the present invention uses a tube envelope that also comprises two sections whose axis are offset. The first section that houses the electron gun is again preferably circularly cylindrical and its axis corresponds to the longitudinal path of the beam before its deflection. The second section that houses the target is essentially rectangular or elliptical in cross section and has one of its two narrow sidewalls preferably formed by the faceplate target. This second section is aligned with respect to the first section such that the longitudinal path of the electron beam through the second section before deflection is adjacent the narrow wall opposite that formed by the faceplate target. Each of the successive electromagnets used for the transverse deflection of the electron beam includes a core portion adjacent the latter narrow sidewall and pole pieces adjacent the two wide sidewalls of the second section.

The invention will be better understood from the following, more detailed description taken in conjunction with the accompanying drawing.

BRIEF DESCRIPTION OF THE DRAWING

FIG. 2B is a sectional view taken along the line BB of FIG. 2A and shows the structure of one of the electromagnets of the array used for deflecting the electron beam transversely for incidence on the fiber optic face plate.

FIG. 4B is a section taken along the line BB of FIG. 4A.

FIG. 5A is a longitudinal section of an improved form of monotube CRT in accordance with the present invention and FIG. 5B is a section taken along the line BB of FIG. 5A.

DETAILED DESCRIPTION

Figure 1A:
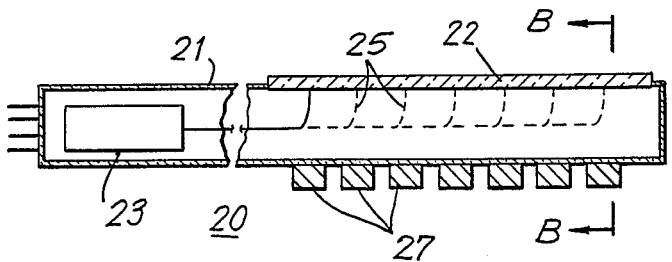
FIG. 1A is a longitudinal section of a monotube CRT of the kind shown in my co-pending application, Ser. No. 151,437, taken along the tube axis.
Figure 1B:
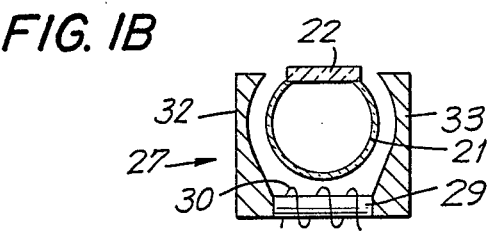

FIGS. 1A and 1B illustrate the simplest form of cathode ray tube 20 of the monotube variety. The tube envelope 21 is a simple elongated glass cylinder of essentially circular cross section along substantially its entire length. Typically this cylinder may be about one and a half inches in diameter and about twenty inches in length to accommodate a fiber optic plate 22 that extends along a sidewall. One end of the tube includes the electron gun 23 that basically is of conventional design. Typically, it is designed to form an electron beam of circular cross section, initially about twenty five mils diameter, and to focus or converge this beam to a diameter of several mils at its focal point. Moreover, it will be advantageous to include provision in the electron beam for varying the focal point dynamically along the tube length for reasons to be discussed subsequently.

The fiber optic faceplate 22 is positioned in a sidewall of the envelope primarily along the downstream half of the tube. In the usual fashion, the faceplate surface inside the envelope is coated with a phosphor while the surface outside the envelope is adapted to contact a recording medium, that is moved past the faceplate for recording the image formed in the faceplate in known fashion.

The fiber optic face plate typically is about fourteen inches long and about a half-inch wide and includes bundles of fused fibers each about ten to fifteen microns in diameter, and the beam incident on the strip typically has a diameter of between two and three mils. Provision is made for periodically perturbing the beam in the vertical direction of the strip by several mils, as it sweeps along the length of the faceplate, to avoid excessive aging of the phosphor by repetitive traces along the exact same path. The movement of the recording medium advantageously is sufficiently slow relative to the speed of the scan to permit several repetitive scans of the same information on the strip to improve the signal-to-noise ratio based on the familiar principles that the noise will add on a random basis while the signal will add cumulatively. Additionally, multiple scans with a slight vertical perturbation will provide a desirable averaging effect that will reduce granularity and streaking.

Additionally, the CRT 20 is provided with a plurality of electromagnets 27 aligned in a linear array essentially along the same longitudinal portion of the envelope that includes the faceplate 22. Each of these electromagnets is so designed that, when energized, it will deflect the electron beam going there past from its longitudinal direction to a transverse direction for incidence on the portion of the faceplate alongside it. The electromagnets of the array are energized in turn so that the electron beam is deflected appropriately to scan the linear strip of optical fibers continuously from one end to the other at a smooth and uniform rate.

As is known, the degree of deflection will depend both on the strength of the magnetic deflecting field, the velocity of the electrons in the beam at the time of deflection, and the distance the electrons go after deflection before incidence on their target.

The strength of the deflecting field is controlled by varying the current supplied to the coils of the electromagnets. To this end, the deflecting array is driven by a power supply that provides on a cyclic basis a series of wave forms that are supplied in turn to the coils of the successive electromagnets of the array, so that each electromagnet is energized in turn. Moreover, each of the pulses has an amplitude that gradually decreases with time so that the deflection radius similarly decreases to provide a sweeping action along the target.

Typically each electromagnet is used to control a length of about one a one-eight inches of the strip, so that for a strip fourteen inches long, about fifteen electromagnets should be assembled in the array, including two or three to establish the beginning of the deflecting field.

In FIG. 1B there is seen in detail the basic structure of an individual electromagnet 27 of the array. It includes a core portion 29 about which is wound a coil 30 to which is supplied an energizing current. Pole pieces 32 and 33, extending from opposite ends of the core 29 on opposite sides of the envelope 21, create a magnetic field that extends transversely across the envelope so that an electron beam flowing axially inside the envelope is deflected in a direction transverse to that flow and to the magnetic lines, for incidence on the faceplate 22 in the sidewall portion of the envelope equidistant from the two pole pieces as shown by lines 25. It is, of course, unnecessary that the beam be deflected at a ninety degree angle and, typically, the deflection angle will be between thirty and sixty degrees because of the shortness of the region over which the deflecting field acts.

It is advantageous that the scan of the faceplate by the beam be relatively smooth. However, a variety of scanning patterns are feasible.

For example, for each scan the beam may be deflected in turn by successive electromagnets in the downstream direction of the electron flow, i.e., a line scan begins by deflection first by the uppermost electromagnet (i.e., the one closest to the electron gun). In this case for unidirectional scan by successive electromagnets, the degree of deflection introduced by any particular electromagnet needs to peak at the time such electromagnet takes over and to gradually reduce until the succeeding electromagnet takes over. This requires that the magnetizing current supplied to an individual coil have a pulse wave form which peaks at its leading edge and gradually reduces to its trailing edge.

Alternatively, by appropriately processing the input signal applied to the CRT, there may be utilized a deflection arrangement in which the line scan moves in the direction opposite that of the electron flow. In this case, each line scan begins by deflection of the beam by the downmost electromagnet and is continued by deflection by its upstream neighbor. In this case, for a time-continuous unidirectional scan, the wave form of the magnetizing current to each coil should be a pulse whose amplitude increases between its leading the trailing edge.

Moreover, it should be evident that by appropriate processing of the signal information before it is applied to the CRT for recording, a scanning pattern may be utilized in which the line scan comprises a succession of scans each in a given direction, either the same or opposite that of the beam, but the scan provided by successive electromagnets is not continuous with time in that each scan does not begin in time at the point in space where the preceding scan ended. With such a signal, it is feasible to begin the scan with the uppermost electromagnet and to supply a magnetizing current to each coil of pulses whose amplitude increases from its leading to trailing edge.

For optimum reproduction quality, it is important that the electron beam be sharply focussed as it is swept along the faceplate. To this end, it is desirable that the electron beam be focused at the time that it is deflected. Since the path length of the beam from its source to the point of deflection is varying with time, it is advantageous to adjust the focus voltage continuously for optimum focus as a function of the beam deflection location. This technique, termed dynamic focusing, is well known in the art. However, it is also known that dynamic focusing typically provides a focused spot size that increases with increasing distance away from the source. For optimum reproduction quality, it is advantageous to use a scanning spot of relatively uniform size that is independent of its position of incidence along the faceplate.

To this end, it is advantageous to apply a second correction to the dynamic focusing to compensate for the varying focused spot size. This can be achieved with an offsetting de-focusing wave form superimposed on the dynamic focus voltage, or by rapidly perturbing transversely the electron beam slightly, the amplitude of the perturbation decreasing with increasing distance from the source end to compensate for the increasing focused spot size with increasing distance along the beam path.

Various techniques for such perturbation are described in my above-mentioned co-pending application, Ser. No. 151,438.

In the monotube CRT just described, at the time of deflection, the beam is essentially centered along the axis of the envelope. This results in some inefficiency since little use is made for deflection of the radial separation of the beam from the envelope. A more efficient configuration is one in which the electron beam at the time of deflection is located proximate the core portion of each electromagnet.

Figure 2:
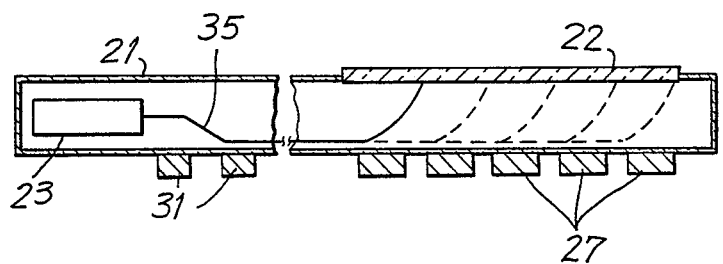
FIG. 2 is a longitudinal section of another form of monotube CRT shown in the same pending application.

FIG. 2 illustrates one technique to this end. A pair of electromagnets 31 are located just beyond the electron gun along the envelope, and they are used to displace the electron beam, launched initially in a direction along the central longitudinal axis of the envelope, for flow along a longitudinal path located near the bottom of the envelope, as shown by the lines 35, close to the core portions of the electromagnets. By so relocating the beam, it is apparent that there is increased effectively the distance over which the beam may be deflected before it is incident on the faceplate, thereby reducing the radius of the deflection and the strength of the magnetic field needed for the deflection. This similarly reduces the amount of energizing current needed to be supplied to the electromagnet.

Figure 3A:
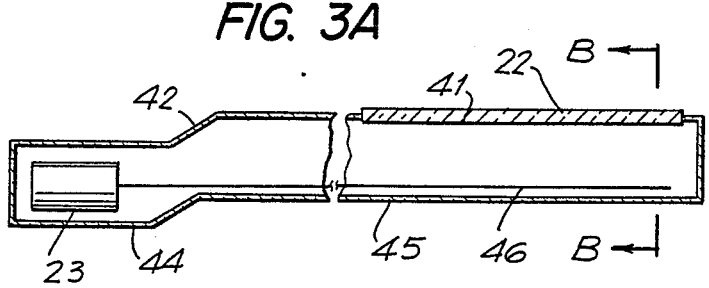
FIG. 3 is a longitudinal section of another monotube CRT shown in that pending application.
Figure 3B:
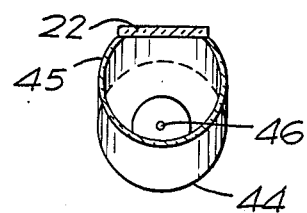

An alternative technique illustrated in the embodiment shown in FIGS. 3A and 3B is to distort axial symmetry of envelope 41 by inclusion of the bend 42 in the envelope to divide the envelope into two sections 44 and 45 whose central axes are displace, so that the beam, although not displaced in direction, will nevertheless proceed on a path close to the bottom of the envelope in the region 45 that includes the faceplate, although initially launched on a path along the central axis of the gun section 44 of the envelope. In this figure, the electromagnets have not been shown to simplify the drawing.

A related technique for effectively increasing the length of the deflection path available would include increasing the diameter of the envelope. This requires longer or larger magnetic pole pieces and consequently undesirably enlarges the entire assembly.

Figure 4A:
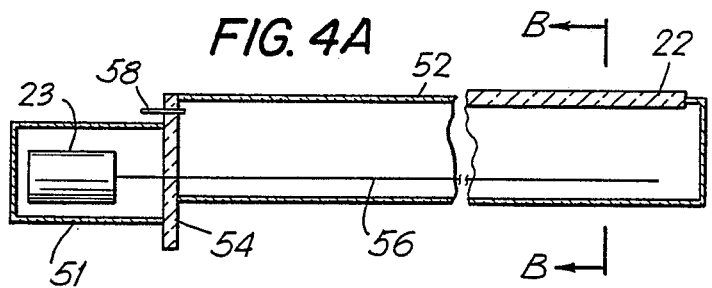
FIG. 4A is a longitudinal section of another monotube CRT shown in that application.
Figure 4B:
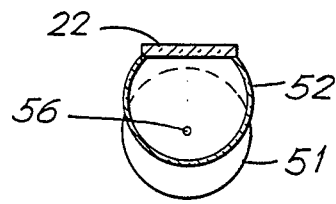
FIG. 4B is a section taken along line BB of FIG. 3A.

Another technique is illustrated in FIGS. 4A and 4B. In this case, the envelope is made in two separate cylindrical circular glass sections 51, 52, each of which is fused to a transition section 54 and aligned to provide an effective step in the resulting envelope, and the electron beam flows along the path shown by the solid line 56. Accurate assembly in the desired alignment is readily achieved by facing the ends of the two sections on a 90 degree glass grinder and by providing a precision jig to hold the two parts in the designed alignment during the sealing steps.

As an added advantage of this geometry, the high voltage connection 58 to the conductive coating included in the inside walls of the envelope used for accelerating the beam can be brought out, as shown, near the transition 54.

In FIGS. 5A and 5B, there is shown a monotube CRT 60 that uses the presently preferred geometry for the tube envelope. In this case, the envelope, typically also of glass, again includes two separate sections 61, 62 each of transition section 64, as with the tube shown in Figs. 4A and 4B. The first section 61 that houses the electron gun 65 is preferably circularly cylindrical and the electron gun is aligned to provide a longitudinal path for the electron beam along the axis of this section. As best seen in Fig. 5B, the section 62 is essentially rectangular in cross section with a pair of relatively narrow side walls 66A, 66B and a pair of relatively wide side walls 66E, 66D. One of the narrow side walls 66A includes an elongated fiber optics faceplate 68 of the size and kind previously described. This faceplate 68 preferably essentially serves as the sidewall 66A. Section 62 is aligned with respect to section 61 so that the longitudinal path 69 of the undeflected electron beam in section 62 is close to the narrow sidewall 66B and centered between the wide walls 66C and 66D.

Positioned along the length of section 62 is the array of electromagnets 70 for providing the transverse deflection of the electron beam as it flows therepast to provide the desired repetitive linear scan of the faceplate 68 in the manner previously discussed.

FIG. 5B shows more the basic structure of an individual electromagnet 70 of the array. Each electromagnet 70 includes a core 72, adjacent sidewall 66b, and about which is wound a coil 73 to which is supplied an energizing current of appropriate waveform as previously discussed Pole pieces 74 and 75, adjacent wide sidewalls 66C, 66D, respectively, create a magnetic field that extends transversely across the envelope between sidewalls 66C, 66D. This field is used to deflect the electron beam flowing inside the envelope along sidewall 66B transversely to the magnetic field for incidence on the faceplate 68 in the opposite sidewall 66A. Again it is unnecessary nor desirable that the beam be deflected at a ninety degree angle and preferably the deflection angle varies between thirty and sixty degrees.

It is characteristic of this structure that is provides a highly efficient magnetic deflection system since it concentrates the magnetic field in a short gap where the electron beam flows.

In one embodiment, Syntronic coil type C-15600-1 has been used for the electromagnets centered at 1.2" intervals. Of course, other sizes and different spacings are feasible.

In practice, for ease of manufacture, the narrow side wall 66B is not perfectly plane but curved. Similarly, for ease of fabrication the wider sidewalls 66C and 66D need not be perfectly plane but also may be slightly curved particularly where they merge with the narrow side walls. Accordingly, the second section also may be viewed as having an elliptical cross section of which the major axis is the wide spacing between walls 66A and 66B and minor axis the spacing between walls 66C and 66D.

Typically, it may be advantageous to include one or more electromagnets (not shown) immediately after the electron gun along section 61 for positioning the beam and for minor deflection of the beam in the plane of the drawing of FIG. 5B to include the noise reduction multiple scan techniques previously mentioned. Additionally, such deflection would be important if a color display is to be provided at faceplate 68 by providing it with a typical R G B (red, green, blue) phosphor arrangement.

In this CRT 60, typical dimensions for the second section 62 compatible with a first section 61 of about 1.5 inches diameter and a faceplate at least fourteen inches long and about 0.5 inches wide would be a spacing of about 0.5 inches between wide walls 66C and 66D and about 1.5 inches between walls 66A and 66B. Again the array might comprise fifteen magnets spaced apart about 1.2 inches for use with the 14 inch faceplate. For a longer facplate, more magnets would be included.

It is to be understood that the specific design described is merely illustrative of the general principles and that various modifications are feasible consistent with the spirit of the invention. In particular, if a color display is desired, the electron gun can be designed to provide there parallel electron beams; one for each of the three primary colors, each modulated separately and deflected transversely in unison for incidence on an appropriate three color faceplate.

Additionally, the endplate 74 shown in FIG. 5A may be treated i the manner described in aforementioned patent application Ser. No 151,439 to be provided with an electron sensitive coating (not shown) for use in monitoring the total current and/or position of the undeflected beam for use in adjusting the amount of current or position of the beams.

What is claimed:

1. A cathode ray tube comprising, means forming an elongated envelope including first and second sections aligned in a longitudinal direction;

an electron gun at an end of the envelope for launching at least one electron beam for flow in a longitudinal path along said envelope;

an elongated target in a sidewall of the envelope along a downstream portion of the envelope;

an array of electromagnets along said downstream portion of the envelope for deflecting the electron beam transversely from its longitudinal path for linear scan of the target; and means for modulating the electron beam in accordance with signal information for varying the number of electrons incident along the target; characterized in that:

the first section of the envelope houses the electron gun and is substantially circularly cylindrical, and the longitudinal path of the electron beam in said section is essentially along its longitudinal axis;

the second section of the envelope houses the target and is substantially rectangular in cross section including a pair of relatively narrow sidewalls and a pair of relatively wide sidewalls, the target being in one of the narrow sidewalls and the undeflected longitudinal path of the electron beam in the second section being adjacent the other narrow sidewall; and each electromagnet of the array includes a core portion adjacent said other narrow sidewall and pole pieces extending from the core portion parallel and adjacent to the wide sidewalls.

2. A cathode ray tube in accordance with claim 1 in which the target is a fiber optics faceplate including electron sensitive means on the inside surface of the faceplate.

3. A cathode ray tube in accordance with claim 1 in which the target is at least fourteen inches long.

4. A cathode ray tube in accordance with claim 3 in which the array comprises at least fifteen electromagnets spaced apart about 1.2 inches.

* * * * *